United States Patent
Lawrence (10) Patent No.: US 6,398,539 B1
(45) Date of Patent: *Jun. 4, 2002

(54) PIZZA DIE WITH SEAL (75) Inventor: Eric C. Lawrence, South El Montey, CA (US)

(73) Assignee: Lawrence Equipment, Inc., South El Monte, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 09/639,022

(22) Filed: Aug. 15, 2000

(51) Int. Cl.[7] .......................... A21C 11/00; B29C 43/02
(52) U.S. Cl. .................. 425/364 R; 425/394; 425/437; 425/403; 425/DIG. 47; 426/496; 426/512
(58) Field of Search .......................... 425/364 R, 394, 425/437, 403, DIG. 47, DIG. 108; 426/496, 512

(56) References Cited

U.S. PATENT DOCUMENTS

| | | | | |
|---|---|---|---|---|
| 4,303,677 A | * | 12/1981 | De Acetis | 426/502 |
| 4,511,324 A | * | 4/1985 | Bauer | 425/398 |
| 5,074,778 A | * | 12/1991 | Betts, Jr. et al. | 425/394 |
| 5,417,989 A | * | 5/1995 | Atwood et al. | 426/496 |
| 5,928,676 A | * | 7/1999 | Notter | 425/DIG. 47 |

\* cited by examiner

*Primary Examiner*—Nam Nguyen
*Assistant Examiner*—Thu Khanh T. Nguyen
(74) *Attorney, Agent, or Firm*—Lyon & Lyon LLP (57) ABSTRACT

A pizza die includes an outer die ring and a plate ring. The outer die ring and an inner die plate are spring-biased away from the die mount plate. The outer die ring includes a plurality of axial ridges located on a portion of the inner circumferential surface of the outer die ring. The inner die plate includes a step on which a flexible seal is seated. A spring-biased plate ring compresses the flexible seal on the seat. The flexible seal includes axial grooves on its outer circumference. The axial grooves engage with the corresponding axial ridges on the outer die ring. The axial grooves act as passageways to vent trapped air within the pizza die. The axial ridges provide a self-cleaning mechanism to remove pizza dough lodged in the axial grooves.

19 Claims, 7 Drawing Sheets

PIZZA DIE WITH SEAL

BACKGROUND OF THE INVENTION

The field of the invention is machines for making food products, such as pizzas.

Pizza shells or crust are made from a dough, typically with wheat flour. For large scale production, the dough is prepared in large batches, and individual doughballs are formed. To make a pizza, the dough must first be molded or flattened to the proper shape and thickness. For hand-made pizza, the dough is flattened by pressing it and stretching it, and via the ever popular pizza hand "toss". Small presses may also be used. For large scale production, a common method for forming pizzas is to press the dough in a pressing machine having one or more pizza dies.

For most pizzas, the pressed pizza dough should preferably produce a finished food product that is close in taste and texture to a hand-made pizza dough. For example, it is preferable that the pressed dough retain its shape after formation. In addition, the pizza should also preferably bake as a hand-made pizza. For instance, it is often preferable that the dough rise during baking, particularly in the crust region of the dough, for so called "rising crust" pizza.

Various attempts have been made to produce pizzas having these characteristics. One method uses multiple dies within a press to flatten the pizza dough. The press exerts a large pressing or flattening force on the dough ball. One common design has an inner die plate within a larger outer die ring. Typically, the inner die further includes a groove around its outer edge to form a ridge, or crust, in the pizza dough. The outer die ring very closely surrounds the inner die.

However, this design has a number of disadvantages. To prevent extrusion of pizza dough through the small gap between the inner die plate and the outer die ring, these components must be machined to extremely close tolerances. This increases the cost of production.

Usually, during pressing, the dough is also heated by heaters on or around the pizza die. However, the heating of the pizza die causes inner die plate and outer die ring to expand at different rates. This expansion of the components requires additional clearance between the inner die plate and outer die ring, to prevent them from seizing or binding. Unfortunately, the increased clearance also tends to permit dough to extrude through the annular gap between them.

Due to the close fit between the inner die plate and the outer die ring, the non-stick coating typically used on these surfaces wears off relatively quickly. This causes the pressed pizza dough to stick to the die, thereby stopping the production line. In practice, removal of the stuck dough from the die generally requires use of makeshift tools, that tend to scratch even more of the non-stick coating off of the die. Once the dough begins to stick, some manufacturers will use higher temperatures and/or longer dwell times to achieve better release characteristics, thereby producing a "hot pressed pizza". However the additional heat produces skin and core temperatures which kill most or all of the yeast in the dough. This prevents the dough from rising when baked.

If the fit between the inner die plate and the outer die ring is too loose, the pizza dough will extrude through the gap during the pressing operation. This causes the pizza dough to stick to the pizza die, also stopping the production line.

On the other hand, if the fit between the inner die plate and outer die ring is too close, excessive heating in the outer die ring results, even though the heating elements are in contact only with the inner die plate. Often, it is preferable for the pizza dough to rise during baking, e.g., for "rising crust" pizza. If the outer ring gets too hot, the yeast in the dough near the outer ring will be killed, thereby, preventing the crust from rising as desired. The close fit of the inner die plate and outer die ring can prevent the desired thermal isolation of the outer die ring.

Another problem encountered in this design relates to the venting of trapped air within the die during pizza formation. Typically, there are grooves located along the bottom face of the outer die ring. The grooves are designed to exhaust the trapped air. Unfortunately, these grooves are frequently blocked by the pizza dough before the trapped air can exit the pizza die. This occurs because the pizza dough has a more direct route through the radial grooves in the outer die ring. It takes a longer amount of time for the pizza dough to travel to the upper groove area in the outer circumference of the inner die plate where the lip of the pizza is formed.

Producers using the traditional inner die plate and outer die ring must balance several factors. For instance, proper pizza formation requires a particular pressure depending on the type of pizza dough. If the pressure is too high, pizza dough extrudes out the gap formed between the inner die plate and the outer die ring. This remains true even if a seal is present between the inner die plate and an outer die ring. The problem is further compounded since trapped air reduces the flow rate of the dough within the die. Consequently, higher pressures are required to overcome this resistance.

For these reasons, the food industry needs better machines and methods for making pizzas, and other food products.

SUMMARY OF THE INVENTION

In a first aspect of the invention, a pizza die includes a die mount plate, an outer die ring, and an inner die plate within the outer die ring. The outer die ring and the inner die plate are attached to the die mount plate. The inner die plate includes an angular step around its circumference. A flexible seal is seated on the angular step and is held in place via plate ring. The plate ring and outer die ring are spring-biased away from the die mount plate.

In a second aspect of the invention, a pizza die includes a die mount plate, an outer die ring, and an inner die plate. The outer die ring includes a plurality of axial ridges located on a portion of the inner circumferential surface of the outer die ring. The inner die plate includes a step around the outer circumference of the inner die plate. A flexible seal is seated on the step. The flexible seal includes axial grooves along its outer circumference, wherein the axial grooves correspond to the axial ridges located on the outer die ring. A plate ring is sandwiched between the die mount plate and the flexible seal and provides an axial compressive force on the flexible seal.

In a third embodiment of the invention, the pizza die of the second aspect has the outer die ring and the plate ring spring-biased away from the die mount plate.

It is an object of the invention to provide improved apparatus and methods for making pizzas and similar pressed food products.

BRIEF DESCRIPTION OF THE DRAWINGS

FIG. 2(*a*) is side view of the pizza die illustrating the outer die ring, the inner die plate, the flexible seal, and the plate ring.

DETAILED DESCRIPTION OF THE PREFERRED EMBODIMENTS

Figure 1:
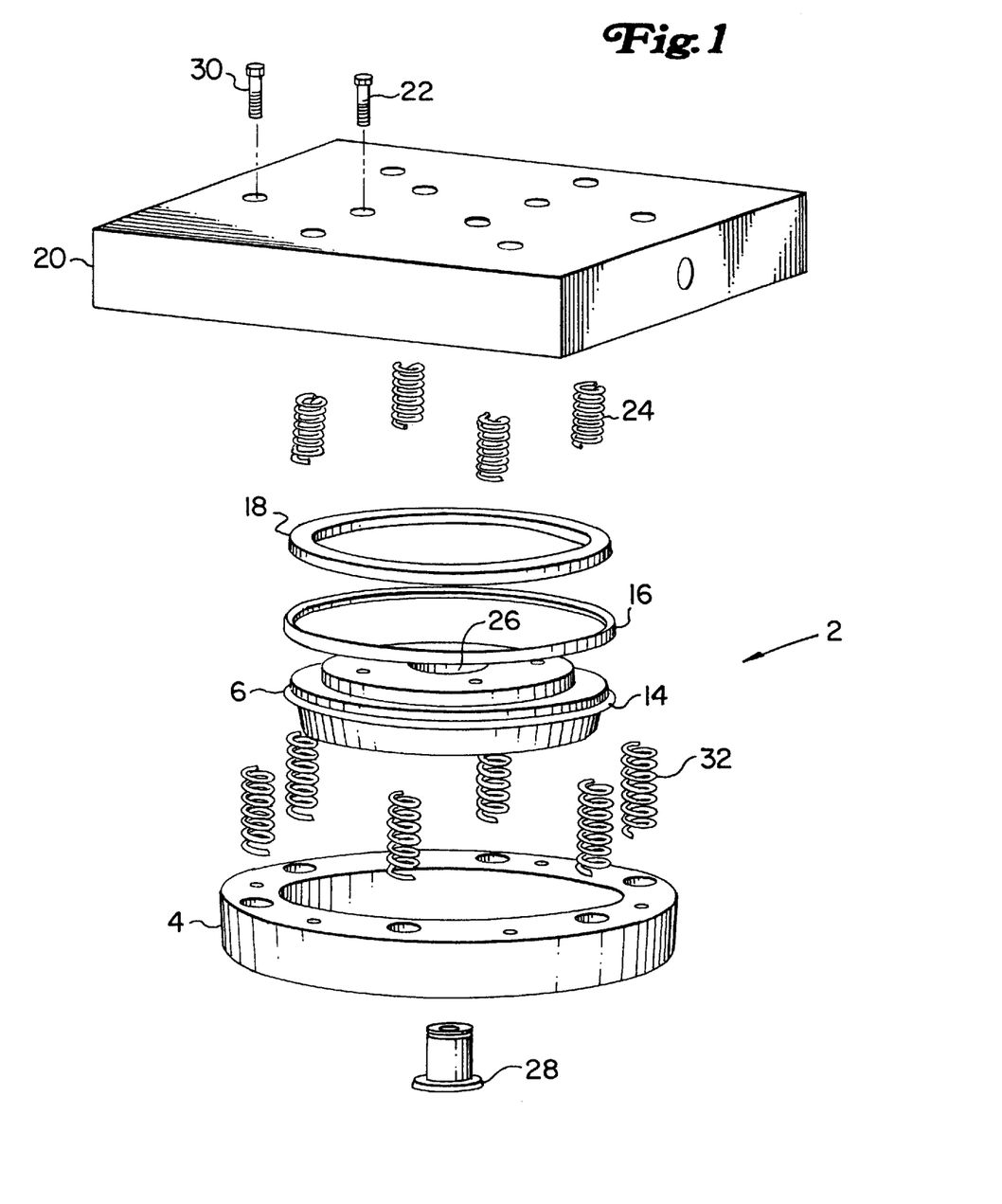
FIG. 1 is an exploded perspective view of the present pizza die.
Figure 5A:
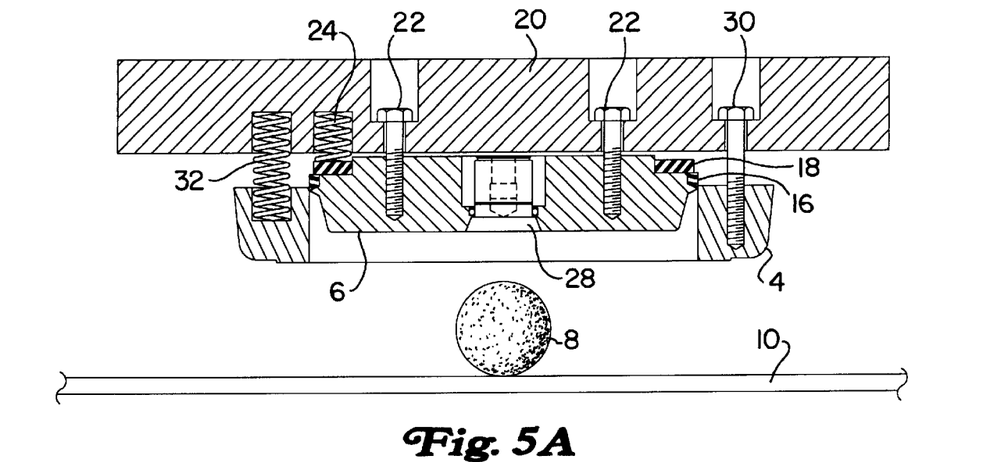
FIG. 5(a) is a side view of the pizza die in a resting or ready position.
Figure 6:
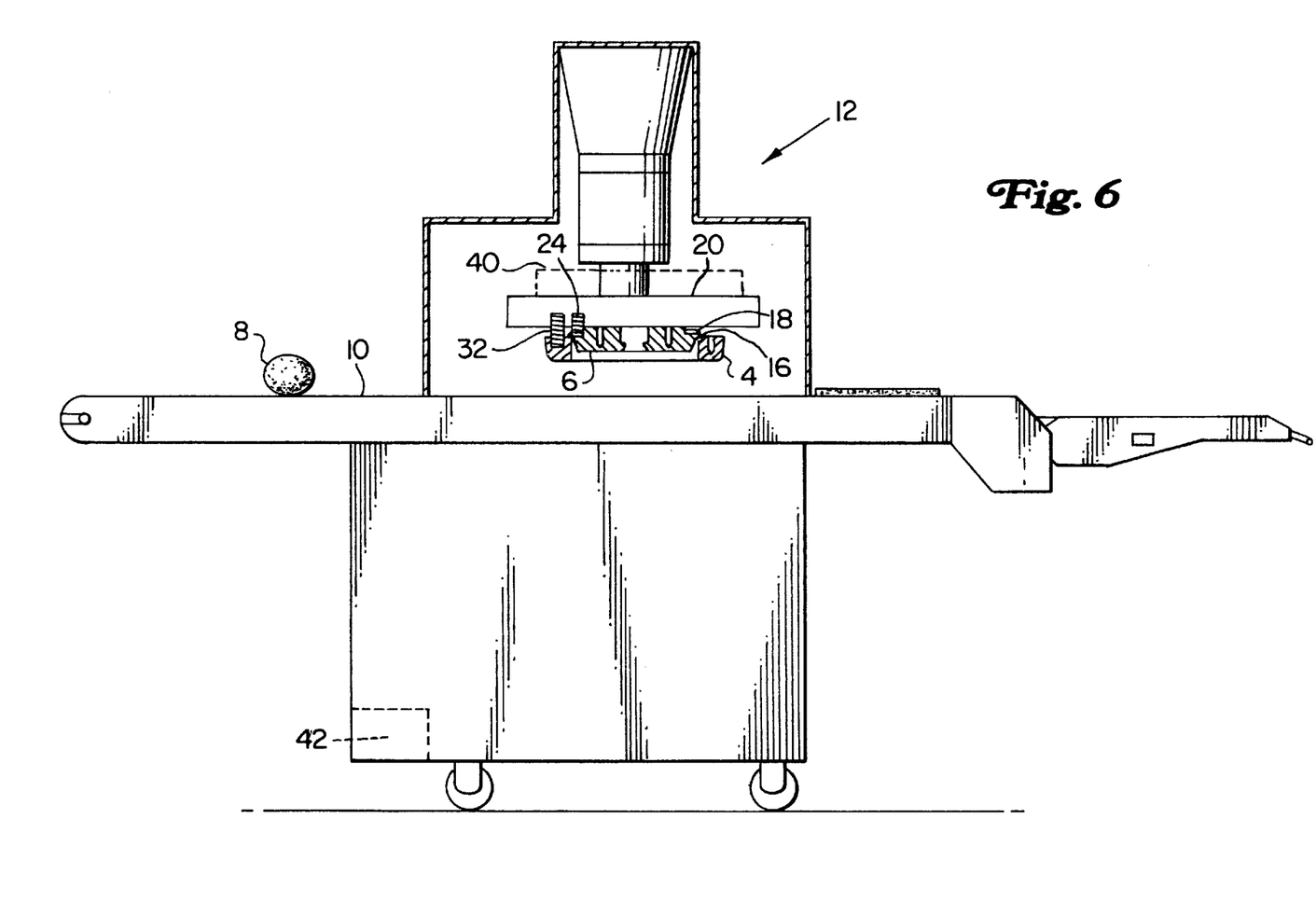
FIG. 6 illustrates the pizza die within a press.

Turning now to the drawings, as shown in FIG. 1, a pizza die 2 includes an outer die ring 4 and an inner die plate 6. Both the outer die ring 4 and the inner die plate 6 are preferably circular in shape. The pizza die 2 is used to press a doughball 8, as shown in FIG. 5(a), to make a pizza or other food product (not shown). The pizza die 2 is horizontal and parallel to a pressing surface, such as a conveyor belt 10 or the like in a press 12 as shown in FIG. 6.

The inner die plate 6 is advantageously made of a thermally conductive metal such as aluminum for use in hot press operations. Preferably, the surface of the inner plate that contacts the pizza dough is coated with a nonstick coating. A fluorine-containing polymer such as TEFLON is one example of a non-stick coating.

Preferably, the outer die ring 4 is also formed of a thermally conductive metal such as aluminum. As with the inner die plate 6, the outer die ring 4 is preferably coated with a non-stick coating on those surfaces that contact the pizza dough.

Figure 2A:
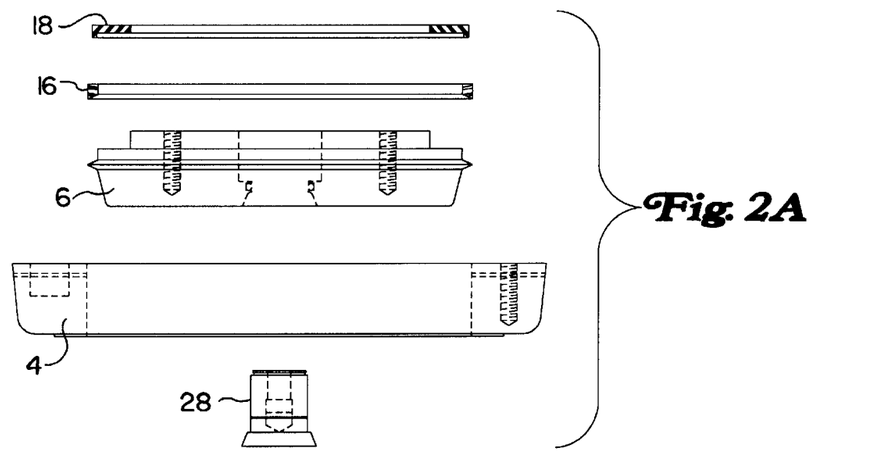
Figure 2B:
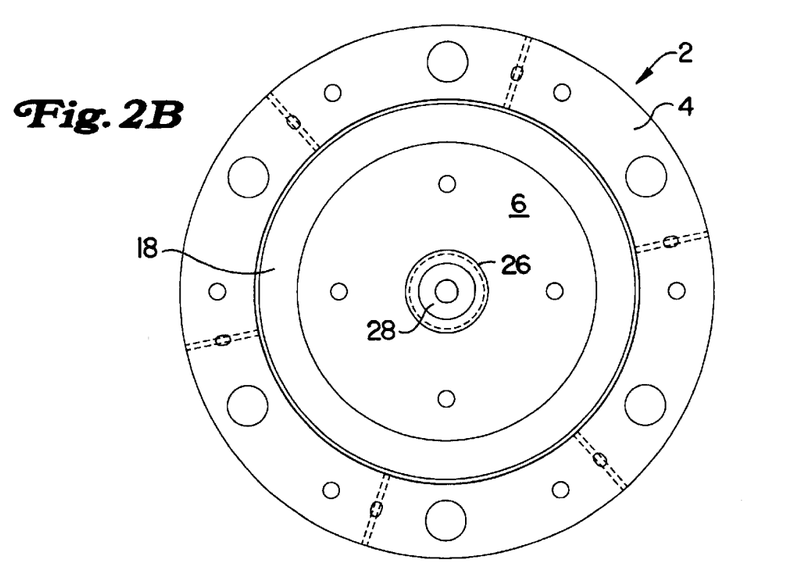
FIG. 2(b) is a top view of the pizza die.
Figure 2C:
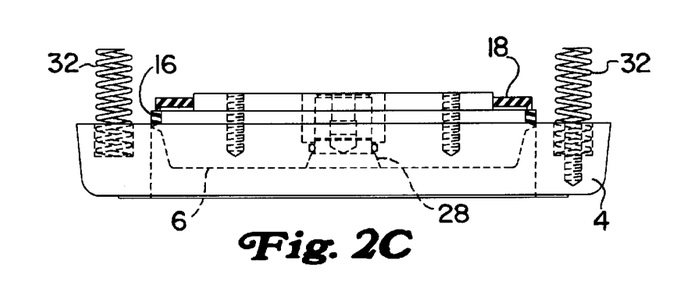
FIG. 2(c) is a side view thereof.

The inner die plate 6 includes a step 14 that extends or projects outwardly. The step 14 preferably surrounds the entire circumference of the inner die plate 6. Referring to FIGS. 2(a) and 4(c) it is preferable that the step 14 is angled downwardly and away from an imaginary horizontal plane passing through the inner die plate 6. The angle of the step 14 helps to create a good seal between a flexible seal 16 seated on the step 14 and the outer die ring 4. However, a completely horizontal step 14 projecting from the inner die plate 6 can also be used.

The flexible seal 16 is circular in shape and is seated on the step 14 projecting from the inner die plate 6. Preferably, the flexible seal 16 is made of a fluorine-containing polymer, such as TEFLON. The flexible seal 16 is advantageously made of a flexible, non-stick material with sufficient strength to retain pressed dough with the pizza die 2.

As shown in FIGS. 1 and 2(a), a plate ring 18 is located above the flexible seal 16. The plate ring 18 acts to sandwich or pinch the flexible seal 16 onto the step 14 of the inner die plate 6. In this regard, the plate ring 18 provides direct axial pressure to the flexible seal 16. The axial pressure causes the flexible seal 16 to compress or bulge outwardly in the radial direction to form a seal against the inner circumferential surface of the outer die ring 4.

The inner die plate 6, flexible seal 16, and plate ring 18 are attached to the die mount plate 20 via bolts 22 (one bolt is shown in FIG. 1). A plurality of springs 24 are positioned between the die mount plate 20 and the plate ring 18 such that the flexible seal 16, and plate ring 18 are spring-biased away from the die mount plate 20.

The inner die plate 6 also includes an air valve 28 in a centrally located opening 26. The air valve 28 is spring-biased into a closed position and rests flush with the flat lower surface of the inner die plate 6. During operation, the air valve 28 opens after pressing to help release the pressed dough from the pizza die 2. A source of compressed air in the press 12 introduces air through the opening 26 to create an air bubble between the inner die plate 6 and the pizza dough. The air bubble helps separate the flattened dough from the pizza die 2 and keeps the dough on the conveyor belt 10 or other pressing surface.

The outer die ring 4 is also bolted to the die mount plate 20 through a series of bolts 30 (one bolt 30 is shown in FIG. 1). A plurality of springs 32 are positioned between the die mount plate 20 and the outer die ring 4. In this manner, the outer die ring 4 is spring-biased away from the die mount plate 20. The length of the bolts 30 determines the spacing between ring 4, and the mount plate 20.

Figure 3A:
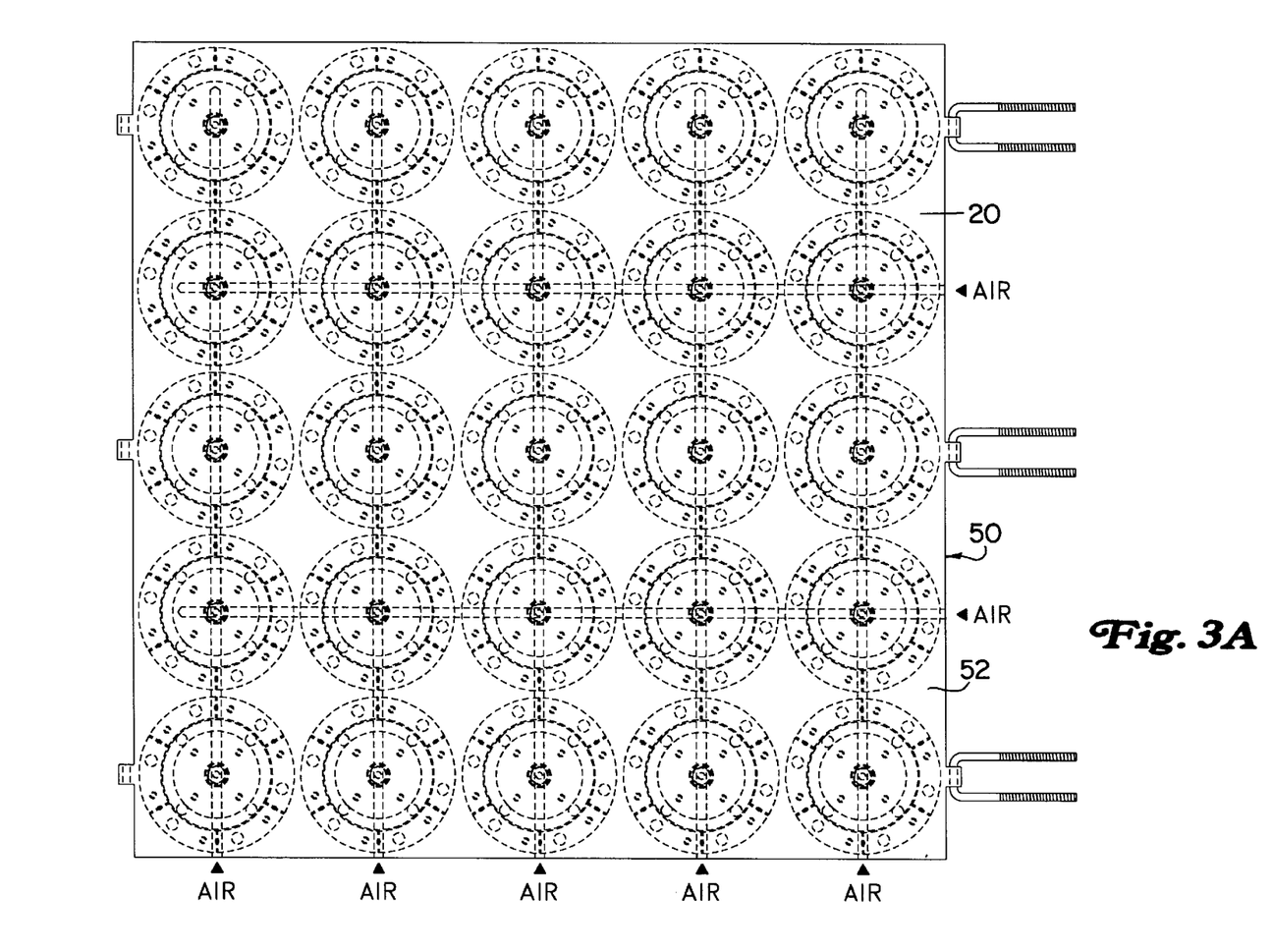
FIG. 3(a) is a top view of an array containing multiple pizza dies.
Figure 3B:
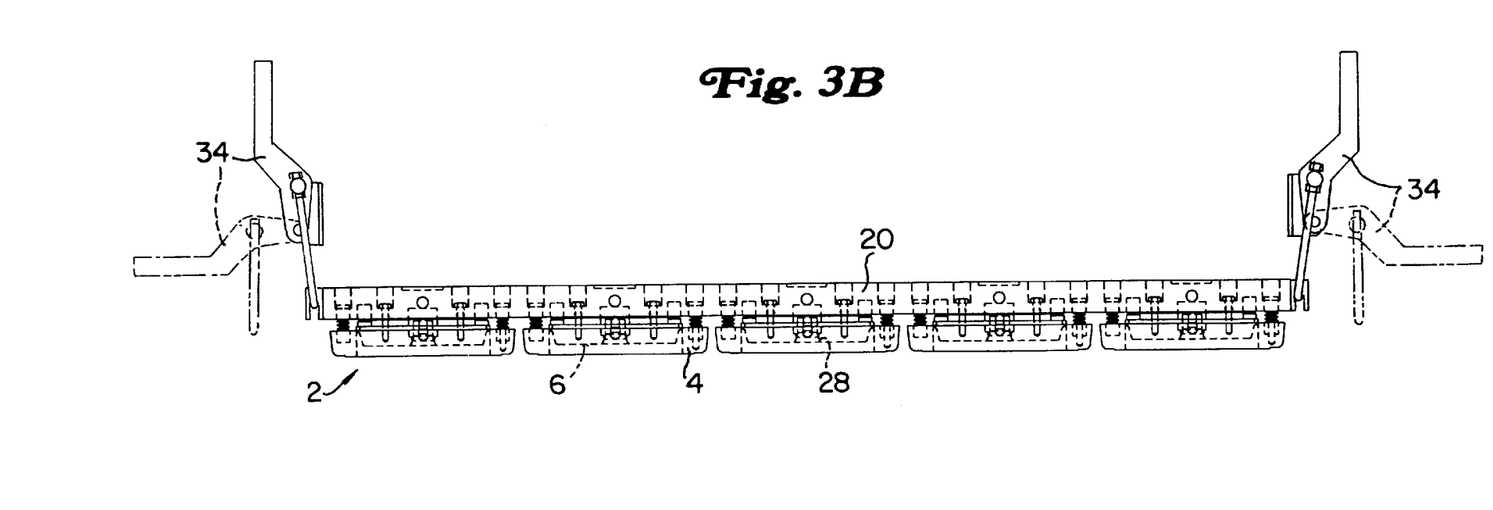
FIG. 3(b) is a side view thereof.

As shown in FIGS. 3(a) and 3(b), in one preferred method of operation, a plurality of pizza dies 2 are arranged in an array 50. The array 50 permits large numbers of pizzas to be formed from one press 12. The press 12 includes a single large die mount plate 52 that further includes a lever mechanism 34 for attaching the plate 52 to the press 12.

Figure 4A:
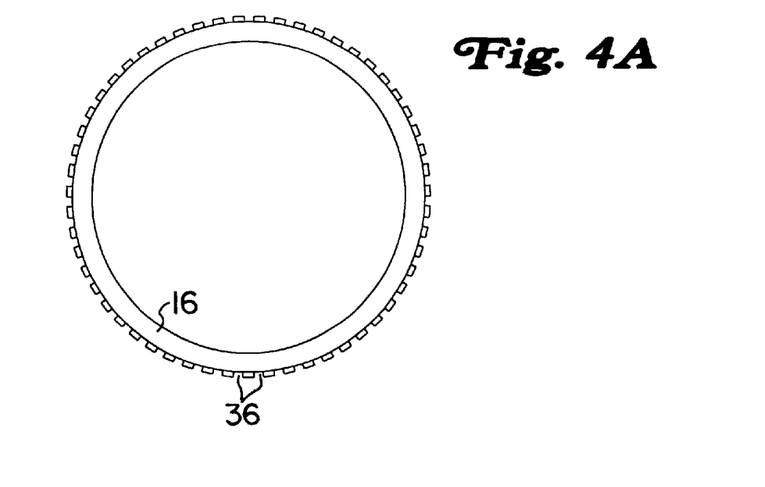
FIG. 4(a) is a top view of the flexible seal including a plurality of axial grooves.

FIG. 4(a) illustrates a top view of the flexible seal 16. A plurality of axial grooves 36 are located around the circumference of the flexible seal 16. The axial grooves 36 preferably extend along a majority of the outer circumference of the flexible seal 16. The axial grooves 36 have different shapes, including square-shaped (as shown in FIG. 4(a)), V-shaped, U-shaped, and the like. Varying numbers of grooves 36 and varying groove positions and orientations can be used.

Figure 4B:
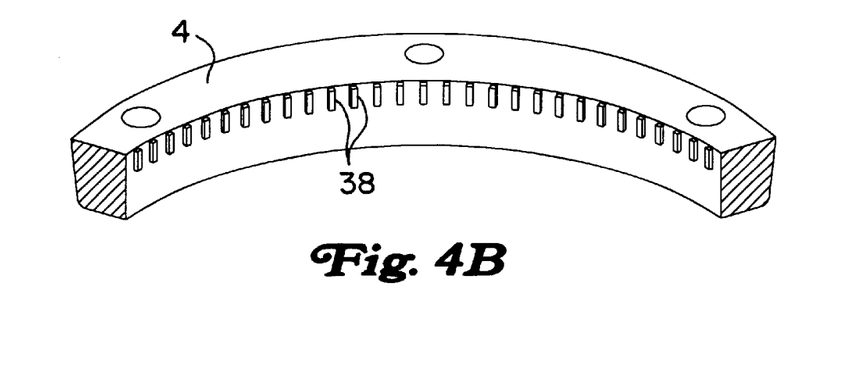
FIG. 4(b) is sectional view of the inner circumferential surface of the outer die ring.
Figure 4C:
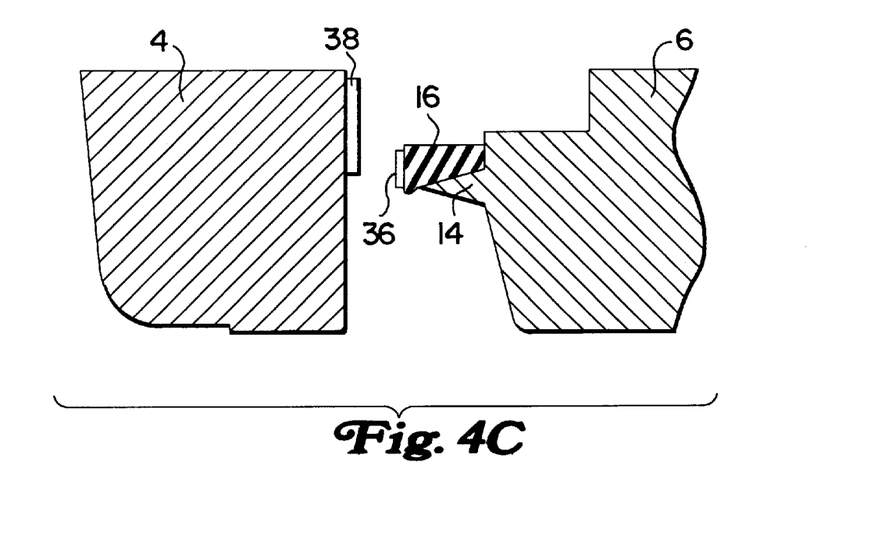
FIG. 4(c) is a side view of the inner die plate, the outer die ring, and the flexible seal.

FIG. 4(b) illustrates an inner circumferential surface of an outer die ring 4. The inner surface includes a plurality of axial ridges 38. The axial ridges 38 are located advantageously on a portion of the inner surface of the outer die ring 4. Preferably, the axial ridges 38 are located on the upper half of the outer die ring 4. In this regard, when the inner die is lowered over the doughball 8, a plurality of openings are created by the axial grooves 36 in the flexible seal 16 such that trapped air can escape. Conversely, when the inner die plate 6 is in a raised position (i.e., as shown in FIG. 5(a)), the axial grooves 36 mate with corresponding axial ridges 38 on the inner circumference of the outer die ring 4. Each axial groove 36 thus has a corresponding and mating axial ridge 38. In addition, the axial ridges 38 act as a self-cleaning mechanism that extrudes any pizza dough that may be lodged in the axial grooves 36 during pizza formation.

FIG. 4(c) illustrates an enlarged view of the inner die plate 6 and the outer die ring 4. The flexible seal 16 is seated on the step 14. The flexible seal 16 is shown in a compressed state wherein the flexible seal 16 bulges or expands outwardly in the radial direction. The axial grooves 36 are shown on the exterior of the flexible seal 16.

FIG. 4(c) also illustrates the outer die ring 4 including corresponding die ring 4 with the axial ridges 38. The axial ridges 38 form a mating-type engagement with the corresponding axial grooves 36. For ease of illustration, FIG. 4(c) shows an exaggerated gap between the axial ridges 38 and axial grooves 36. In operation, the axial ridges 38 and axial grooves slidably or closely engage each other.

Turning to FIG. 6, in one embodiment of the invention, a vacuum source 40 is located above the pizza die 2. The vacuum source 40 is used to help remove trapped air within the pizza die 2. In addition, the vacuum source 40 assists the flow of pizza dough to the region of the pizza die 2 where the lip of the pizza is formed. The vacuum pulls air and pizza dough towards the axial grooves 36 when the pizza die 2 is in the compressed state. The vacuum source 40 may be controlled via a controller 42 to turn on and off at predetermined times to prevent the pizza dough from exiting the pizza die 2.

Figure 5B:
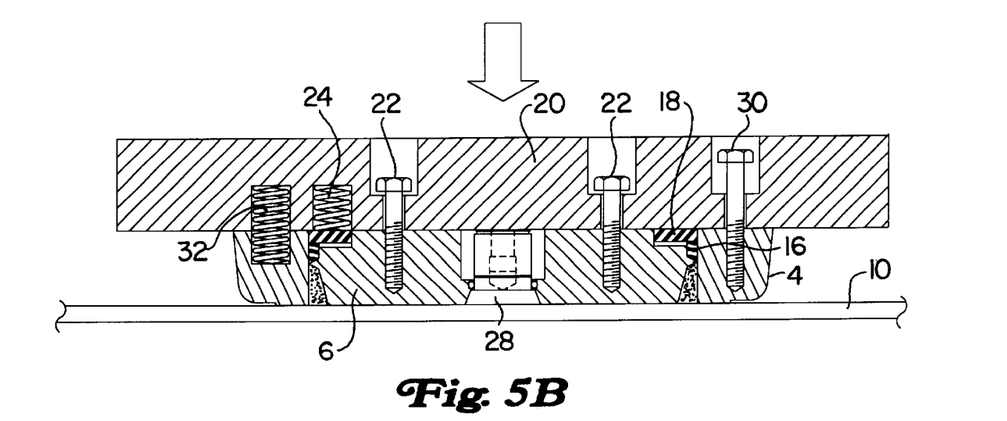
FIG. 5(b) is a side view of the pizza die in a pressing position.

Referring now to FIGS. 5(a) and 5(b), during operation, the ring 4 and plate 6 are in the ready position shown in FIG. 5(a). The ring 4 is biased by the compression springs 32 as far apart from the mount plate 20 as permitted by the length of the attaching bolts 30. The plate ring 18 is similarly biased away from the mount plate 20 by the springs 24, but by a smaller distance. The pizza die 2 is lowered to a first stop position over a doughball 8 on a conveyor press belt 10 or the like. The outer die ring 4 is pressed tightly against the pressing surface such as conveyor belt 10, via the springs 32. This movement (usually about a 4–6 inch drop) flattens the doughball 8 to an initial thickness via the inner die plate 6 pushing down on the doughball 8. The first stop position is selected to provide adequate spring force pressing the ring 6 against the belt 10.

During this initial flattening step the pizza die 2 is still in the extended position, shown in FIG. 5(a). In this state, the inner die plate 6 is recessed from the outer die ring 4 to form a cavity for receiving and initially flattening the doughball 8. After the outer die ring 4 contacts the belt 10, the pizza die 2 then moves down to a second stop position, as shown in FIG. 5(b). The inner die plate 6 and mount plate 20 are pushed down, usually about another ½ inch, under a large pressing force, pressing the dough radially outwardly, and causing the dough to flatten and spread to the outer die ring 4. The plate ring springs 24 cause the plate 18 to compress the seal 16 and cause it to bulge out slightly.

When the inner die plate 6 presses the dough, the plurality of axial grooves 36 located on the external surface of the flexible seal 16 slidably disengage from the corresponding axial ridges 38. Consequently, each axial groove 36 acts a passageway from the inner recess of the pizza die 2 to the outside environment. Trapped air can advantageously exit the pizza die 2 with ease.

Upon further pressing, the dough reaches the flexible seal 16, wherein the dough forms a ridge within the crescent space, to form the pizza lip or outer ridge. The central area of the pizza is flattened to a final thickness, forming a pizza shell. Optionally, the inner die plate 6 and the outer die ring 4 are heated to partially cook the pizza dough. For so called "rising crust" pizza, the outer die ring 4 is advantageously at a lower temperature than the inner die plate 6, thereby permitting the yeast in the periphery of the dough to survive the hot-press process.

After sufficient duration of heating the pizza dough, the inner die plate 6 is retracted into the extended state shown in FIG. 5(a) to release the dough from the die 2. During this release, the air valve 28 opens to release compressed air between the dough and the inner die plate 6. The air forms a bubble that aids in releasing the dough from the pizza die 2. After release, the entire pizza die 2 is lifted up. If a conveyor belt 10 is used, the conveyor is advanced to bring the next doughball 8, or an array of doughballs, into position for pressing. At the same time, the released pizza shell moves on the conveyor to a next station for freezing, baking or packaging. Of course, in most applications, an array of pizza dies 2 will be used in a single press 12, so that several food products can be made with each press cycle.

The current trend in the pizza industry is to make all pizza shells in a central plant freeze them before baking, and ship them to retail/restaurant outlets. The outlets often want live yeast in the shell, so that it will rise when baked. Cold pressing is the most common way for making shells having live yeast. However, cold pressing requires each doughball 8 to be placed into a pan. The pan is indexed under a press. The press partially spreads the pizza. The shell then travels on a conveyer for 5 to 45 minutes to a second press station which completes the pressing. While cold pressing works, it has several significant disadvantages. The pans must be replaced periodically, as they deform from the pressing. Cleaning the pans is also time consuming and burdensome. The present invention allows a hot press method to produce a cold press quality (live yeast) product, without the drawbacks of cold pressing.

While embodiments of the present invention have been shown and described, various modifications may be made without departing from the scope of the present invention. The invention, therefore, should not be limited, except to the following claims, and their equivalents.

What is claimed is:

1. A food press comprising:
   a die mount plate;
   an outer die ring, attached to the die mount plate;
   an inner die plate within the outer die ring, the inner die plate including a step around its circumference;
   a flexible seal disposed on the step; and
   a plate ring on the seal.

2. The food press according to claim 1, wherein said flexible seal includes axial grooves on the outer circumference thereof.

3. The food press according to claim 2, wherein axial ridges are located on at least a portion of an inner circumferential surface of said outer die ring, the axial ridges corresponding to the axial grooves on said flexible seal.

4. The food press according to claim 1, wherein said flexible seal extends in a radial direction when compressed in an axial direction.

5. The food press according to claim 1, wherein the flexible seal comprises a fluorine-containing polymer.

6. The food press according to claim 1, wherein said inner die plate comprises a centrally located opening for a passage of compressed gas.

7. The food press according to claim 2, further including a source of vacuum for drawing air through the grooves in said flexible seal during pizza formation.

8. The die comprising:
   a die mount plate;
   an outer die ring, the outer die ring including a plurality of axial ridges located on at least a portion of an inner circumferential surface of said outer die ring;
   an inner die plate within the outer die ring, the inner die plate including a step around an outer circumference of the inner die plate;
   a flexible seal surrounding the step, said flexible seal including axial grooves on the outer circumference thereof, the axial grooves corresponding to the axial ridges located on said outer die ring; and
   a plate ring, the plate ring sandwiched between the die mount and the flexible seal.

9. The die according to claim 8, wherein said flexible seal extends in a radial direction when compressed in an axial direction.

10. The die according to claim 8, wherein the flexible seal comprises a fluorine-containing polymer.

11. The die according to claim 8 further including a source of vacuum for drawing air through the grooves in said flexible seal during pizza formation.

12. The die according to claim 8, wherein said inner die plate comprises a centrally located opening for a passage of compressed gas.

13. The die according to claim 8, wherein the inner die plate is spring-biased away from the die mount plate.

14. The die comprising:

a die mount plate;

an outer die ring, the outer die ring spring-biased against said die mount plate, the outer die ring including a plurality of axial ridges located on at least a portion of an inner circumferential surface of said outer die ring;

an inner die plate within the outer die ring, the inner die plate including an angular step around the outer circumference of the inner die plate;

a flexible seal surrounding the angular step, said flexible seal including axial grooves on an outer circumference thereof, the axial grooves corresponding to the axial ridges located on said outer die ring; and a plate ring, the plate ring pinching said flexible seal on the step of the inner die plate, said plate ring being spring-biased away from the die mount plate.

15. The die according to claim 14, wherein said flexible seal extends in a radial direction when compressed in an axial direction.

16. The die according to claim 14, wherein the flexible seal comprises a fluorine-containing polymer.

17. The die according to claim 14, wherein said inner die plate comprises a centrally located opening for a passage of compressed gas.

18. The die according to claim 14 further including a source of vacuum for drawing air through the grooves in said flexible seal during pizza formation.

19. The food press die of claim 1 with said plate ring spring-biased against said die mount plate.

* * * * *